(12) United States Patent
Wood et al.

(10) Patent No.: US 7,040,577 B2
(45) Date of Patent: May 9, 2006

(54) ATTACHMENT APPARATUS FOR INJECTION-MOLDED FRAMELESS CANOPIES

(75) Inventors: Jeffrey H. Wood, Eureka, MO (US); Terry A. Sewell, Ballwin, MO (US); Steven J. Miener, Florissant, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/960,144

(22) Filed: Oct. 7, 2004

(65) Prior Publication Data

US 2006/0054743 A1 Mar. 16, 2006

Related U.S. Application Data

(63) Continuation of application No. 10/367,064, filed on Feb. 13, 2003, now abandoned.

(51) Int. Cl.
*B64C 1/14* (2006.01)

(52) U.S. Cl. .................... 244/129.3; 244/121

(58) Field of Classification Search .............. 244/121, 244/129.3, 129.4, 129.5, 131, 1 R, 122 AF, 244/122 AG; 292/121, 122, 126, 131, 134, 292/107, 108, 219, 220, 230, 231; 16/419, 16/444, 412, 114.1
See application file for complete search history.

(56) References Cited

U.S. PATENT DOCUMENTS

| | | | | |
|---|---|---|---|---|
| 2,652,996 | A | | 9/1953 | Yujuico et al. |
| 3,618,881 | A | * | 11/1971 | Fellers et al. ............... 244/121 |
| 3,843,982 | A | * | 10/1974 | Lane et al. ................ 114/361 |
| 3,913,971 | A | * | 10/1975 | Green ........................ 296/218 |
| 4,375,281 | A | | 3/1983 | Nichols |
| 4,580,745 | A | * | 4/1986 | Brophy ................. 244/122 AF |
| H451 | H | * | 4/1988 | Pinnell ....................... 244/121 |
| 5,085,383 | A | * | 2/1992 | Larkin et al. ............... 244/121 |
| 6,796,528 | B1 | * | 9/2004 | Wood et al. ................ 244/121 |

* cited by examiner

*Primary Examiner*—T. Nguyen
(74) *Attorney, Agent, or Firm*—Lee & Hayes, PLLC (57) ABSTRACT

An apparatus and method for latching a canopy to a vehicle, such as an aircraft, that avoids plastic creep and crazing due to concentrated loads is provided. The apparatus includes first attachment components that are at least partially embedded within an injection-molded canopy and second attachment components that are connected to the canopy rail for attaching to the one or more first attachment components and thereby attaching the canopy to the canopy rail.

5 Claims, 8 Drawing Sheets

ATTACHMENT APPARATUS FOR INJECTION-MOLDED FRAMELESS CANOPIES

PRIORITY

This invention is a Continuation Application of U.S. patent application Ser. No. 10/367,064, filed Feb. 13, 2003 now abandoned, which is hereby incorporated by reference.

GOVERNMENT LICENSE RIGHTS

This invention was made with Government support under U.S. Government contract F33615-97-2-3407 awarded by the U.S. Air Force. The Government has certain rights in this invention.

FIELD OF THE INVENTION

This invention relates generally to vehicles with canopies and, more specifically, to closing mechanisms for injection-molded canopies.

BACKGROUND OF THE INVENTION

Modern aircraft canopies contain many parts. A transparent portion of the canopy may be replaced several times during the life of an aircraft due to scratches and general deterioration. Replacement of the transparent portion entails frame disassembly and reassembly. This is time-consuming, labor intensive, and costly.

Attempts have been made to produce frameless aircraft canopies in order to simplify replacement of the transparent portion, among other reasons. However, a frame provides structural stiffness and strong, secure, attachment points for hinges and latches. As is known, the viable frameless canopy system must include a method for latching. Prior latching methods include a male hook or pin located on the aircraft structure or canopy frame and a female receiver on the canopy frame structure or aircraft structure respectively. Such discrete latching methods produce concentrated loads, which cause bearing stress in the transparency in the region of the latch.

Stress causes problems for transparencies. Glassy polymers craze at low stress levels. The effect of crazing on crack growth and localized failure is not well understood. Polymer transparencies yield at low stress levels and creep occurs after a fraction of service life. Cyclic, long-term loading, such as cockpit pressurization, induces creep and/or craze and reduces service life. Elevated temperatures, such as those experienced by high-speed aircraft, further increase the rate of creep and amplify the effect of crazing.

Therefore, there exists an unmet need to produce a latching system for an injection-molded canopy which avoids plastic creep or crazing due to concentrated loads yet securely holds the canopy in place.

SUMMARY OF THE INVENTION

The present invention provides an apparatus and method for latching a canopy to a vehicle, such as an aircraft, that avoids plastic creep or crazing due to concentrated loads. The apparatus includes first attachment components that are at least partially embedded within an injection-molded canopy and second attachment components that are connected to the canopy rail for attaching to the one or more first attachment components and thereby attaching the canopy to the canopy rail.

In another aspect of the invention, the first component includes a shaft with two ends and one or more knobs attached to the ends of the shaft. The knobs are molded into the canopy, and the shaft is exposed within a cavity formed by the canopy. The cavity is opened at a base of the canopy.

In still another aspect of the invention, the first component includes a hook at least partially embedded within the canopy. A portion of the hook protrudes from a base edge of the canopy.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
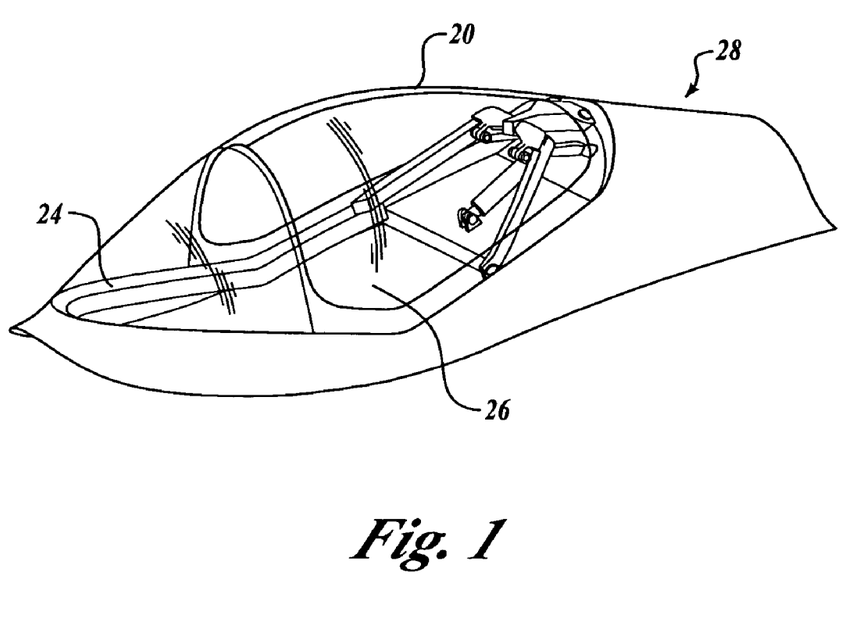
FIG. 1 illustrates an injection-molded frameless canopy attached to a vehicle in accordance with the present invention.

The present invention is an injection-molded canopy with canopy attachment devices that are inserted into the canopy during an injection molding process. As shown in FIG. 1, an exemplary canopy 20 attaches to a canopy rail 24 that surrounds a cockpit 26 of a vehicle 28, such as an aircraft.

Figure 2:
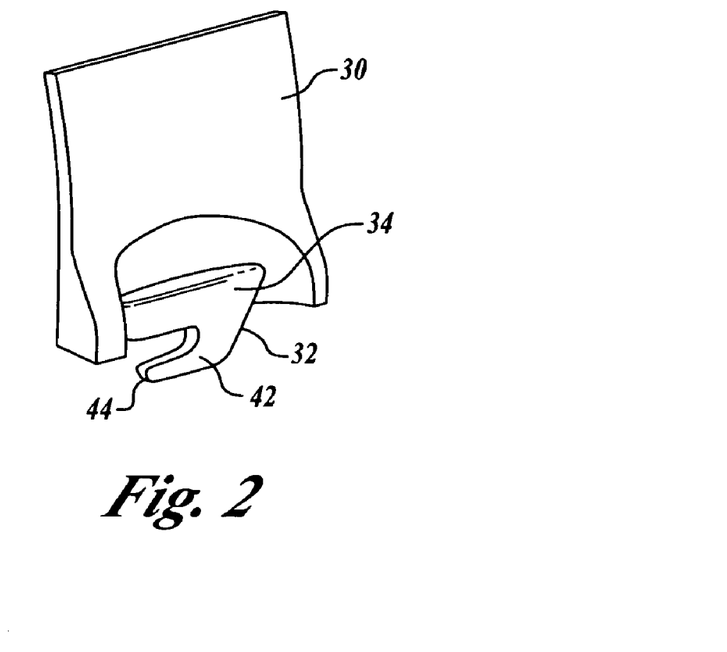
FIGS. 2 and 3 illustrate x-ray perspective views of a first embodiment for attaching the canopy to the vehicle.
Figure 3:
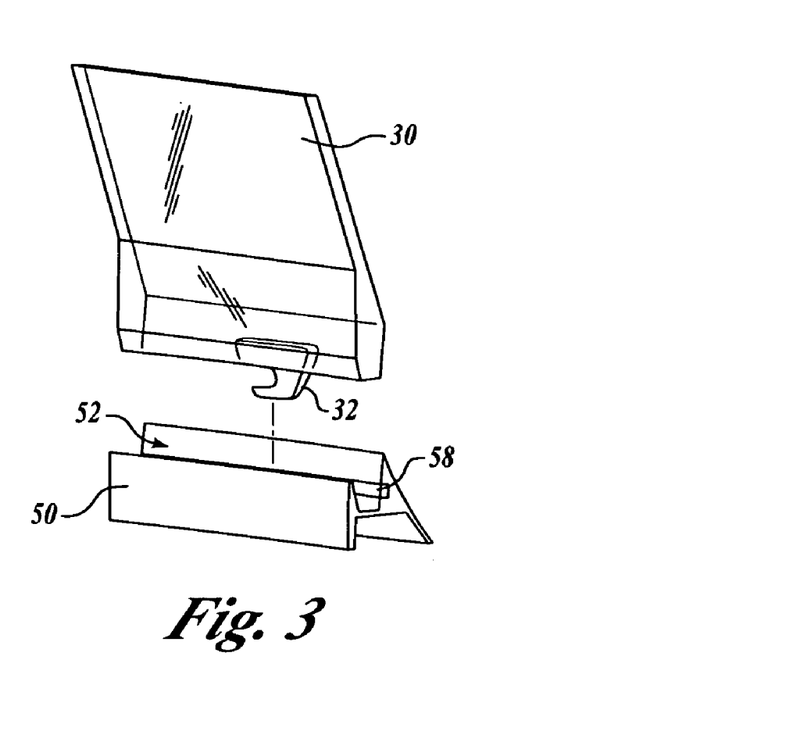

FIGS. 2 and 3 illustrate a first embodiment of an attachment device that is molded into an injection-molded canopy 30. The attachment device is suitably a hook 32. The hook 32 is substantially U-shaped. A first section 34 of the hook 32 expands in length away from a centerline of the hook 30. A first section 34 is embedded within the canopy 30 during the injection molding process. A second section 42 of the hook 32 is exposed below the canopy 30. The second section 42 includes a claw 44 and a U-shaped indent caused by the claw 44 and the first section 34. When the injection-molded canopy 30 is fully formed around the first section 34, the material of the canopy 30 holds the hook 32 in place by putting pressure on the expanded edges of the first section 34.

A canopy rail 50 includes a canopy-receiving channel 52 that receives the canopy 30 and the mounted hook 32. The canopy rail 50 is attached around a cockpit in a conventional manner. One of the walls of the channel 52 suitably includes an inflatable seal 58 that is attached to a pneumatic or hydraulic system (not shown) that is included within the vehicle. The inflatable seal 58 inflates when the canopy 30 is inserted into the channel 52 and locked in place in the canopy rail 50. The inflatable seal 58 provides a moisture and air pressure seal between the vehicle cockpit and the environment outside of the cockpit.

In one embodiment, the canopy 30 is first inserted into the rail 50. The canopy 30 is moved by a support structure (not shown), thereby making contact between the U-shaped cutout of the hook 32 and a locking mechanism (not shown) that is included as part of the canopy rail 50. Co-pending patent application Ser. No. 10/367,062, hereby incorporated by reference, illustrates a mechanism for receiving the hook 32 without requiring fore and aft motion of the canopy 30 when the canopy 30 is inserted into the channel 52.

Figure 4:
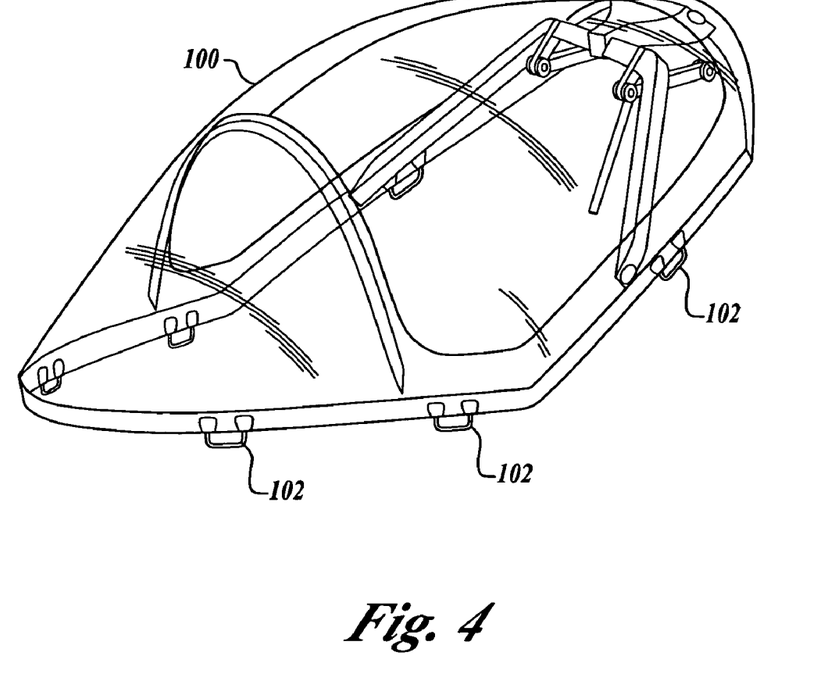
FIG. 4 illustrates a perspective view of a canopy that includes an attachment mechanism in accordance with the second embodiment of the present invention.
Figure 5:
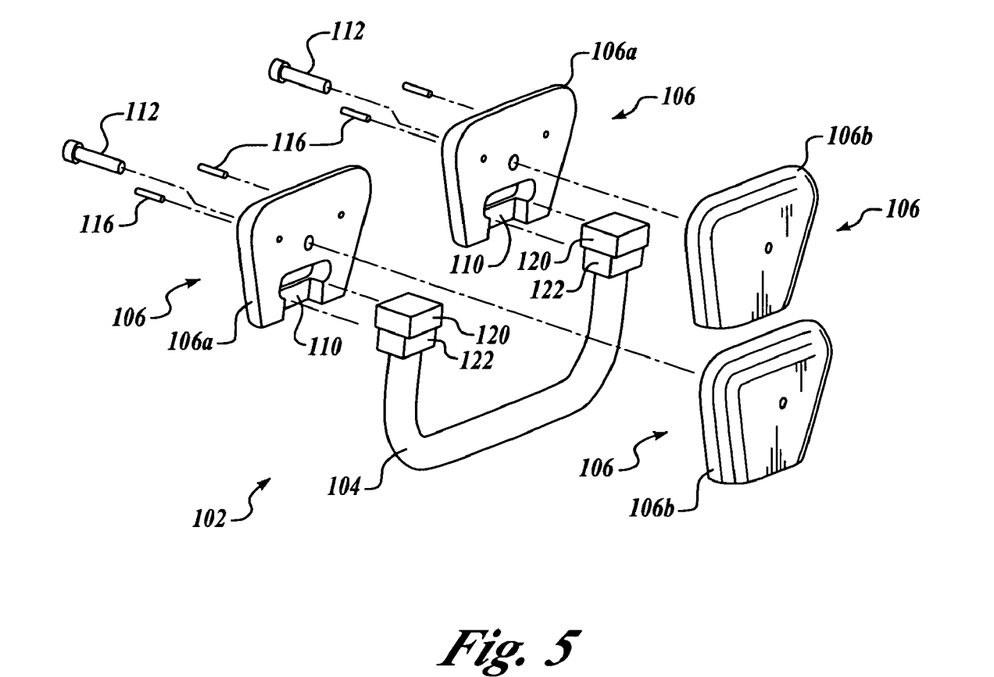
FIG. 5 illustrates an exploded perspective view of the handrail attachment mechanism shown in FIG. 4.

FIG. 4 illustrates a perspective view of a second embodiment of an attachment device that is embedded within a canopy 100 during an injection molding process. In this embodiment, the attachment mechanisms are imbedded handle devices 102. As shown in FIG. 5, the imbedded handle devices 102 include a U-shaped handle 104 and two pair of handle end holders 106. Each pair of the handle end holders 106 includes a first part 106a and a second part 106b. Each of the parts 106a,b includes a cavity that forms a cavity 110 that receives an end of the handle 104 when the parts 106a,b are combined. The parts 106a,b are attached to each other by a fastener 112, such as without limitation a screw or a bolt, that is received through the first part 106a and is securely mounted into the second part 106b. One or more securing pins 116 are received by respective pinholes in the first part 106a and are received into receiving cavities (not shown) within the second part 106b. The pins 116 help reduce any rotational movement between the first and second parts 106a,b. It can be appreciated that other fastener mechanisms, such as without limitation an adhesive, may be used for attaching the parts 106a,b. Each end of the handle 104 includes a top section 120 that is wider from a centerline point than a bottom section 122. The cavities 110 include chambers sized to receive each of the top and bottom sections 120 and 122. Thus, when each parts 106a,b are coupled to each other with the ends of the handle 104 inserted within the cavities 110, the handle 104 is held securely by the pairs of handle end holders 106.

The end holders 106 are then inserted in a mold for the injection-molded canopy 100 such that when the molding of the canopy 100 is complete, the pairs of end holders 106 are surrounded by the molded canopy 100 and only the handles 104 protrude out of the base of the canopy 100. In this embodiment the parts 106a,b are trapezoidal in shape with a first length at the side that includes the cavity 110 that is smaller than a second length of the side that is opposite the side that includes the cavity 110. Therefore, because the parts 106a,b are wider at a point that will be further embedded into the canopy 100 after the molding process, the canopy material that surrounds the parts 106a,b holds the parts 106a,b securely in place.

Figure 6:
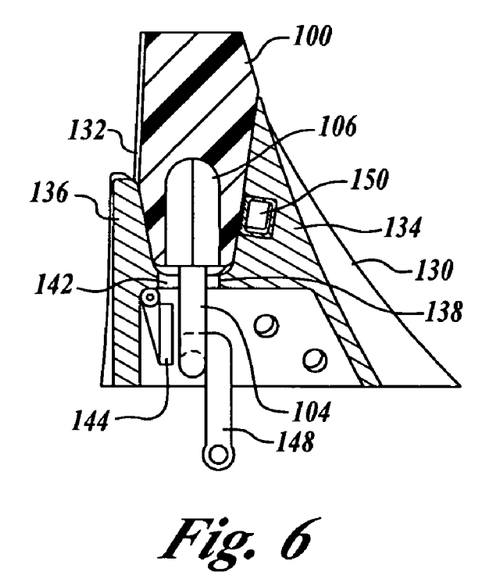
FIG. 6 illustrates a cutaway side view of the canopy of FIG. 4 attached to a canopy rail.
Figure 7:
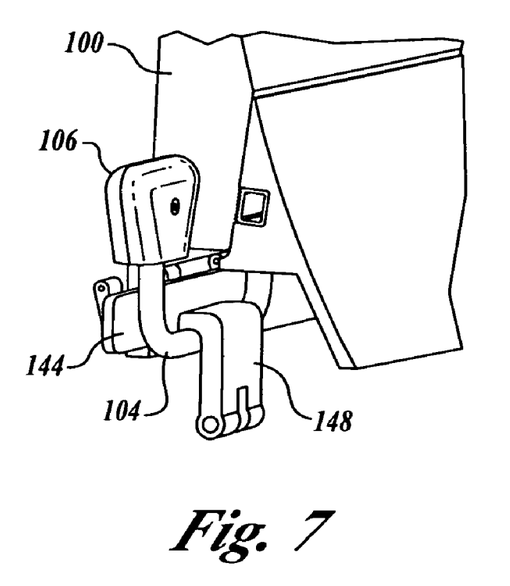
FIG. 7 illustrates a cutaway perspective view of the system shown in FIG. 6.

FIGS. 6 and 7 illustrate a non-limiting example of mechanisms for securing the handle 104 to a canopy rail 130. The canopy rail 130 includes a canopy receiving channel 132 that is formed by an interior wall 136, a base 138, and an exterior wall 134. When the canopy 100 is received within the canopy channel 132, the handle 104 passes through an opening 142 within the base 138 of the channel 132. The opening 142 suitably includes a cap 144 that is spring-loaded to be forced open by the handle 104 when the handle 104 passes through the opening 142. The cap 144 is suitably spring-hinged to the interior wall 136 underneath the base 138. The cap 144 keeps water and other particulates from entering an interior of the canopy rail 130 when the canopy 100 is in an open position. The canopy rail 130 includes a handle-receiving hook 148 that rotates into position to grip the handle 104 once the handle 104 has fully penetrated the opening 142. The hook 148 is suitably operated by conventional electromechanical devices and is activated when a switch (not shown) indicates that the canopy 100 is in proper position within the canopy channel 132. The switch can be included within the cap 144. The hook 148 keeps the handle 104 within the rail 130 thereby securing the canopy 100 to the canopy rail 130.

In one embodiment, the exterior wall 134 of the canopy rail 130 includes an inflatable seal 150 along a wall of the channel 132. The seal 150 inflates by a pneumatic or hydraulic system (not shown) that is included within the vehicle once the canopy 100 is fully seated within the channel 132. The seal 150 provides a moisture and air pressure lock between the environment within the cockpit and outside of the cockpit.

Figure 8:
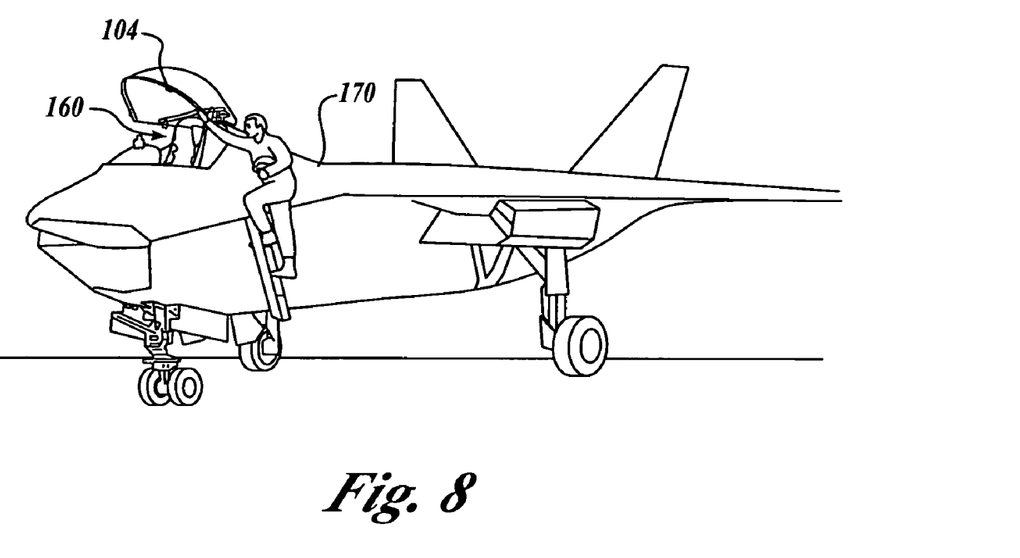
FIG. 8 illustrates a perspective view of an aircraft that includes the canopy shown in FIG. 4.

FIG. 8 illustrates that the hooks 104 can be used to aide a pilot during ingress and egress from a cockpit 160 of an aircraft 170.

Figure 9:
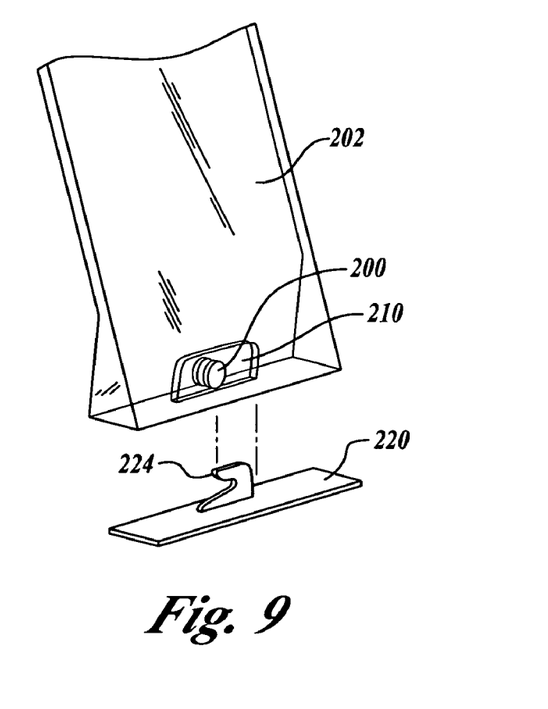
FIGS. 9–11 illustrate cutaway perspective views of a canopy that includes an attachment mechanism in accordance with a third embodiment of the present invention.
Figure 10:
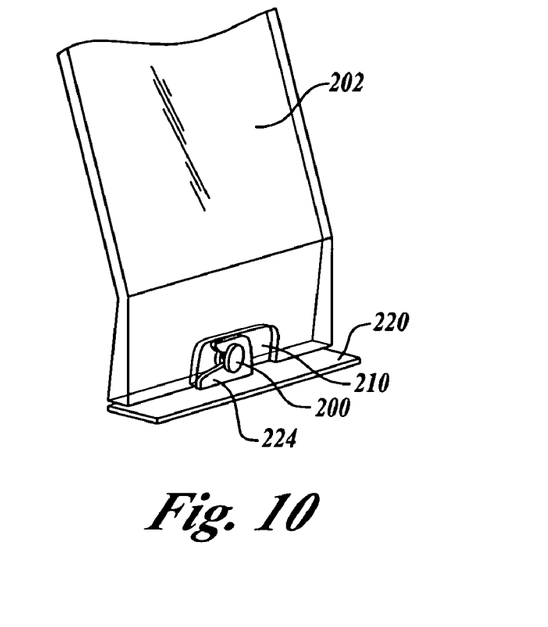
Figure 11:
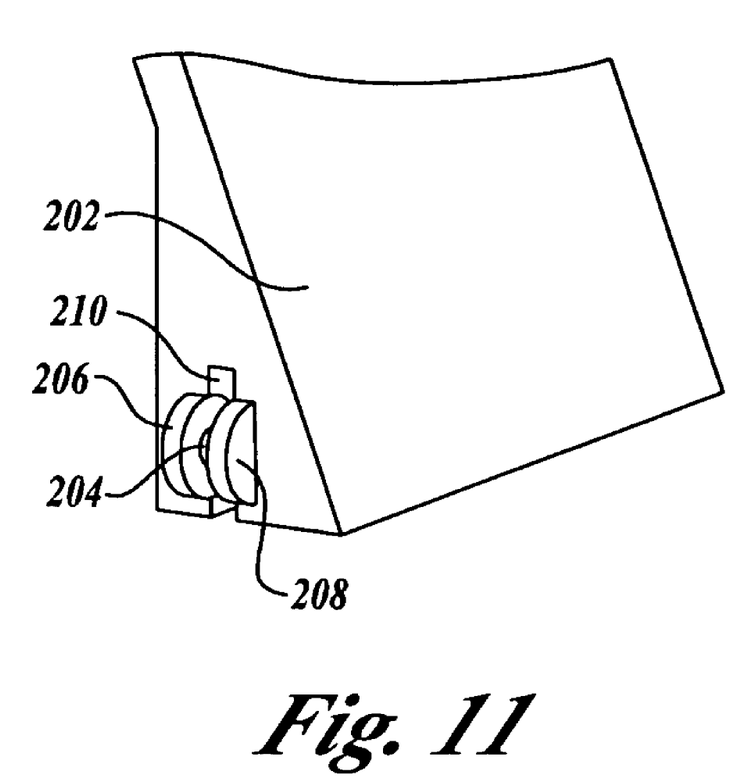

FIGS. 9–11 illustrate perspective x-ray views of a third embodiment of the present invention. An attachment device 200 is embedded within an injection-molded canopy 202. The attachment device 200 includes a shaft 204 with two knob ends 206 and 208. During the injection-molding process of the canopy 202 the attachment device 200 is inserted near the base of the canopy 202. The canopy 202 is molded so that the knob ends 206 and 208 are at least partially embedded within the canopy 202 and the shaft 204 has its longitudinal axis substantially perpendicular to a lengthwise axis of a cavity 210. The shaft 204 is approximately centered within the cavity 210. The cavity 210 is exposed at the base of the canopy 202.

Referring to FIGS. 9 and 10, a canopy rail 220 includes a hook device 224. When the canopy 202 is closed onto the canopy rail 220, the hook device 224 is received by the cavity 210. Then, either the canopy 202, the hook device 224, or the canopy rail 220 with the attached hook device 224 are slid so that the shaft 204 is received by the hook device 224, thus locking the canopy 202 to the rail 220.

It can be appreciated that various other types of attachment mechanisms can be imbedded within an injection-molded canopy during canopy creation.

While the preferred embodiment of the invention has been illustrated and noted above, many changes can be made without departing from the spirit and invention. Accordingly, the scope of the invention is not limited by the the preferred embodiment. Instead, the invention should be determined entirely

What is claimed is:

1. An apparatus for attaching a canopy to a canopy rail, the apparatus comprising:
    at least one pair of base supports being permanently embedded within an injection-molded canopy; and
    a handle with one or more ends, wherein each of the one or more ends includes a first section having a first width and depth dimension and a second section having a second width and depth dimension that is less that the first width and depth dimension,
    wherein each of the base supports includes a first cavity section and a second cavity section, the first cavity section being sized based on the first width and depth dimension and the second cavity section being sized based on the second width and depth dimension.

2. The apparatus of claim 1, further comprising a device for attaching to the handle when the canopy is positioned in a closed position with respect to the canopy rail.

3. The apparatus of claim 2, wherein the device includes an arm that rotates about a pivot point within the canopy rail.

4. The apparatus of claim 2, wherein the canopy rail includes a door for receiving the handle.

5. The apparatus of claim 4, wherein the door is biased to close when the canopy is an open position.

* * * * *